Patented Oct. 25, 1949

2,485,927

UNITED STATES PATENT OFFICE 2,485,927

CATALYTIC DEHYDROGENATION OF HYDROCARBONS

Walter A. Schulze and John C. Hillyer, Bartlesville, Okla., assignors to Phillips Petroleum Company, a corporation of Delaware No Drawing. Original application June 21, 1943, Serial No. 491,702. Divided and this application May 5, 1947, Serial No. 746,166

8 Claims. (Cl. 260—669)

The present invention relates to the catalytic dehydrogenation of hydrocarbons, for example, dehydrogenation of olefins to diolefins, alkylbenzene to alkenylbenzenes such as ethylbenzene to styrene, and similar reactions. In a more particular aspect the present invention relates to a process for the conversion or dehydrogenation of such hydrocarbons utilizing a new and improved multi-component catalyst composition.

It is therefore an object of the present invention to provide an improved process for the catalytic dehydrogenation of hydrocarbons, particularly for the dehydrogenation of butenes to 1,3-butadiene, ethylbenzene to styrene, and similar dehydrogenation of hydrocarbons to hydrocarbons of lower degrees of unsaturation.

It is a further object of the invention to provide an improved process for the dehydrogenation of hydrocarbons such as butenes, utilizing an improved multi-component catalyst.

Other objects and advantages of the invention, some of which are specifically referred to hereinafter, will be apparent to those skilled in the art.

The present application is a division of application Serial No. 491,702 filed June 21, 1943, U. S. Patent 2,431,427, issued November 25, 1947, entitled "Dehydrogenation catalysts."

A preferred catalytic composition of the invention is a pelleted alumina-base catalyst associated with oxides of barium, magnesium and potassium. The advantages of the pelleted catalyst include uniform size and lowered pressure drop in the catalyst case where low operating pressures are desirable. However, bauxite may serve as a source of the alumina used as the catalyst base, with suitable treatment to activate and preferably to remove iron and silica impurities.

Preferred catalytic compositions of the present invention are those which are included in the following ranges:

| Component: | Weight per cent |
|---|---|
| Barium Hydroxide | 4–6 |
| Magnesium oxide | 2–4 |
| Potassium hydroxide | 4–6 |
| Alumina | Remainder |

In the production of these improved catalysts of the invention, the added metal hydroxides or oxides may be provided in the form of the metal salts, and converted to the hydroxides or oxides by subsequent treatment. The quantities of metal salts added are calculated in terms of the final compound.

While the functions of the individual components of the catalyst composition are not limited to any particular theories, the alumina is often regarded as the basic catalyst with certain of its catalytic properties modified by the added ingredients. The modifications may be directed toward improving the conversion efficiency by either suppressing undesirable transformations or prolonging the practical conversion period. Specific modification in this case also is directed toward improved catalyst characteristics for the reactivation operation that is carried out with an oxygen-containing reactivation gas.

The finished catalyst composition also possesses high activity in the presence of steam which is used as diluent during either the processing or reactivation steps. This water-resistant feature is inherent in alumina and is substantially improved by the added components.

One principal effect of the presence of the barium hydroxide in the catalyst is the reduction of olefin and product losses through cracking and polymerization. The magnesia component reduces the isomerization of normal butenes. The potassium hydroxide which is present in the catalyst composition reduces or completely inhibits the tendency of the catalyst to deposit carbon during conversion and reduces the frequency and time requirements of subsequent reactivation treatments. Both effects are related to promotion of the water-gas reaction between steam and carbon by the potassium hydroxide.

The catalyst compositions of the invention may be prepared by:

(1) Dry mixing and pelleting of dry ingredients followed by heat or other treatment necessary to convert the components of the composition to the desired form.

(2) Impregnation of alumina pellets with a solution of the metal salts or hydroxides, followed by drying or calcination, and (3) Wet mixing of the ingredients followed by extrusion and drying in pills of suitable size.

Of these three methods, the first two produce catalysts of superior mechanical strength, porosity and catalytic activity. The impregnation method (method 2) is preferred to the first in some cases because the catalyst activity and mechanical strength are higher. However, with proper calcination, etc., the dry-mixed pellets may be brought to high activity.

Preferred methods of preparing the catalysts of the present invention are illustrated by the following preparations:

Preparation A

Alumina trihydrate substantially free of iron is calcined at about 650° F. until the water content is reduced to 9 to 12 per cent by weight. The partially dehydrated alumina is then mixed with magnesia and barium carbonate in the following proportions and pelleted with the aid of a small amount of a fatty acid or fatty acid soap as a lubricant:

| Component: | Parts by weight |
|---|---|
| Alumina ($Al_2O_3$) | 21.8 |
| Magnesia (MgO) | 0.7 |
| Barium Carbonate ($BaCO_3$) | 1.3 |

The resulting pellets are calcined at approximately 1100° F. to remove water, carbon dioxide and lubricant. The calcined pellets are then treated with sufficient potassium hydroxide (KOH) solution (10%) to add the desired weight of KOH and dried. Subsequent calcination gave a catalyst preparation of the following composition, on a dry basis.

| Component: | Per cent by weight |
|---|---|
| Alumina ($Al_2O_3$) | 86.0 |
| Magnesia (MgO) | 3.1 |
| Barium hydroxide ($Ba(OH)_2$) | 5.7 |
| Potassium hydroxide (KOH) | 5.2 |

Preparation B

Alumina trihydrate is partially dehydrated (9 to 12% moisture content) and pelleted with the aid of a fatty acid or fatty acid soap into ⅛ inch x ⅛ inch pills. Lubricant is then removed by calcination at about 1000° F. The calcined pellets are then impregnated with the added metal oxides or hydroxides in separate steps as follows:

(1) Treatment with a solution of magnesium acetate followed by calcination at approximately 1000° F.
(2) Treatment with a solution of barium hydroxide followed by calcination at approximately 1000° F.
(3) A final impregnation with 10% potassium hydroxide solution, followed by drying.

The finished catalyst had the following composition, on a moisture-free basis:

| Component: | Per cent by weight |
|---|---|
| Alumina ($Al_2O_3$) | 85.0 |
| Magnesia (MgO) | 3.8 |
| Barium hydroxide ($Ba(OH)_2$) | 5.2 |
| Potassium hydroxide (KOH) | 6.0 |

Preparation C

The catalyst was prepared as described in Preparation B with the exception that potassium carbonate solution was used in the final treatment instead of a solution of potassium hydroxide.

Preparation D

Partially dehydrated alumina, magnesia, barium carbonate and potassium carbonate were mixed dry in the desired proportions and pelleted. The pellets were calcined at 1290° F. for a period substantially longer than was employed for preparations made by the foregoing impregnation treatments.

Preparation E

The desired proportions of alumina trihydrate, magnesia, barium carbonate and potassium carbonate were mixed, lubricated with water, and extruded through dies to produce pellets. The pellets were calcined at 1100° F. to produce a catalyst with the following composition:

| Component: | Per cent by weight |
|---|---|
| Alumina ($Al_2O_3$) | 88 |
| Magnesia (MgO) | 3 |
| Barium hydroxide ($Ba(OH)_2$) | 3 |
| Potassium oxide ($K_2O$) | 6 |

Preparation F

Alumina trihydrate pellets prepared as described in Preparation B were impregnated with metal salts as follows:

(1) The pellets were treated with a solution of magnesia and barium hydroxide dissolved in acetic acid. After adsorption of requisite quantities of this solution, the pellets were calcined at 950° F.
(2) The calcined pellets bearing magnesium and barium compounds (oxides or hydroxides) were next impregnated with potassium carbonate solution and dried to remove water.

The finished catalyst had the following approximate composition, on a moisture-free basis:

| Component: | Per cent by weight |
|---|---|
| Magnesia (MgO) | 4 |
| Barium hydroxide ($Ba(OH)_2$) | 5 |
| Potassium hydroxide (KOH) | 7 |
| Alumina ($Al_2O_3$) | 84 |

While the foregoing preparations exemplify preferred compositions, the proportions of the ingredients may be varied widely. However, larger proportions of the modifying ingredients are not usually needed to obtain the desired results, and catalyst costs may be increased without compensating advantages when the three materials added to the alumina amount to more than about 10 to about 20 per cent by weight of the final composition. Final addition of potassium hydroxide or carbonate or similar alkaline potassium salt is usually preferred to neutralize any acidic residues in the catalyst pellets.

While the quantities of barium and potassium hydroxides may be varied within the limits of approximately 3 per cent or less to approximately 10 per cent or more by weight of the catalyst composition, the magnesia content is preferably less than approximately 5 per cent by weight. This quantity is sufficient to provide improved catalyst characteristics, but not apparently great enough to introduce undesirable catalytic or mechanical properties. Large proportions of magnesia often increase the activity of the catalyst toward cracking reactions, and the mechanical strength of the catalyst pills is somewhat decreased as the magnesia content is increased above the preferred proportions.

Untreated synthetic alumina pellets or granules when employed in dehydrogenation reactions, such as in the conversion of normal butenes to butadiene, exhibit an initial period of low butadiene production, usually termed an induction period, before maximum conversion to butadiene is reached. During this induction period, isomerization of the normal butene to isobutene is noted, as well as formation of heavy liquid polymers. Carbon deposition upon such a single-component catalyst is also relatively rapid at normally preferred operating conditions.

When alumina pellets are treated with barium hydroxide and magnesia, without potassium hydroxide, beneficial effects during conversion are noted, including higher initial conversion to butadiene and decreased isomerization and polymerization. The average conversion efficiency is thereby increased, and butadiene yields are improved.

The addition of potassium hydroxide to such an alumina-magnesia-barium hydroxide catalyst composition produces a further unexpected improvement in dehydrogenation reactions, particularly when steam is used as an inert diluent and heat carrier to reduce the partial pressure of $C_4$ unsaturates in the reaction mixture. With the preferred multi-component catalyst compositions specified above, practical conversion periods are lengthened, apparently by a reduction in the rate of carbon deposition on the catalyst, and the on-stream time of each catalyst vessel is increased. Furthermore, when reactivation is desirable, because of progressive diminution of or decrease in catalytic activity, reactivation is more quickly accomplished with oxygen-containing gases than with other catalysts that do not contain potassium hydroxide. A preferred reactivation procedure involves the use of mixtures of steam and air, in which some endothermic carbon-removing reactions are apparently important factors in promoting rapid reactivation with satisfactory temperature control.

Magnesia and barium hydroxide remain undissociated at the temperatures employed for butadiene production and catalyst reactivation, so that the catalyst is subject to only extremely gradual deterioration or mechanical attrition with continued use. The potassium hydroxide in the presence of magnesia and barium hydroxide is unexpectedly stabilized and its modifying effects are substantially prolonged to correspond to ultimate catalyst life, despite the high temperatures employed. This is in contrast to catalysts consisting solely of alumina and alkali-metal hydroxides, which under certain high temperature conditions usually undergo deteriorative changes.

The length of the conversion period with the present catalyst varies with the hydrocarbon feed being treated and the conversion conditions. Under preferred conditions for butadiene production the conversion period may range from about four to twelve or more hours before reactivation becomes necessary because of lowered conversion. Such extended conversion periods indicate the moderate rate of carbon deposition, even at severe conversion conditions, particularly when steam is present in relatively large proportions in the reaction mixture.

Reactivation of the catalyst is usually accomplished by burning off carbonaceous deposits with air, oxygen or oxygen-containing gas mixtures. The reactivation gas may comprise mixtures of steam and air or mixtures of recycle, combustion or flue gases with air. The presence of steam in the reactivation gas is often desirable for use with the present catalyst. It is preferred to control the rate of reactivation so that the time required is substantially less than the conversion period, while maintaining temperatures between approximately 1000° and approximately 1400° F.

In the dehydrogenation of normal butenes to produce butadiene, preferred conversion temperatures for use with the present catalyst are approximately 1100° to approximately 1300° F. Hydrocarbon space velocities of 500 to 5000 volumes may be employed. In one modification of the catalytic dehydrogenation step, low superatmospheric pressures are used, and it is preferred to maintain partial pressures of butene in the feed below atmospheric pressure. Low butene partial pressures may be obtained by dilution with a gas that is substantially inert under the conversion conditions.

Since the present catalyst is particularly adapted to use with feed stocks containing water vapor, steam is the preferred diluent. However, other gases, such as hydrocarbons more refractory than normal butenes, and carbon dioxide, nitrogen, and the like may be employed.

The following examples illustrate specific characteristics of preferred catalyst compositions of the invention, as well as results that are obtained when such catalyst compositions are used in the catalytic dehydrogenation of n-butenes.

Example 1

A catalyst prepared according to the method described in Preparation B hereinabove was utilized in the form of 1/8 inch x 1/8 inch pills to dehydrogenate a mixture of 1-butene and 2-butene. The catalyst was disposed in tubes of relatively small diameters heated by hot flue gases from a feed preheater. The butene charge was admixed with steam in a ratio of three volumes of steam per volume of hydrocarbon, and the total vapor mixture was passed through the catalyst tubes at from 1200° to 1210° F., at 3 pounds gage pressure, and at a space velocity of 1300 volumes per hour. The resulting products were quenched with water, compressed and fractionated to separate $C_4$ hydrocarbons from lighter and heavier material. Butadiene was separated from unreacted butenes, and the latter were returned to the catalytic treatment.

Analysis of products from a series of operating cycles gave the average yield figures shown in the following table. Each cycle consisted of 8 hours on processing and somewhat less than 8 hours on reactivation.

| Cycle | 1 | 6 | 12 | 16 | 26 |
|---|---|---|---|---|---|
| Average Conversion per pass (Weight Per Cent Butene Charged) | 27.2 | 29.5 | 28.5 | 30.0 | 28.0 |
| Average Butadiene Yields per pass (Weight Per Cent Butene Charged) | 16.3 | 17.8 | 17.3 | 18.1 | 17.1 |
| Average Ultimate Butadiene Yield (Weight Per Cent Butene Charged) | 60 | 61 | 61 | 60 | 61 |

The above figures show an average conversion per pass of 29 per cent by weight of the butene charged. The ultimate yields of butadiene during the 8-hour processing period ranged from 55 to 65 per cent. The amount of isobutene formed by isomerization was negligible, and carbon deposition was controlled by the water gas reaction to a value of about 2 per cent by weight of the butene charged. Carbon-removal as carbon oxides during processing amounted to about 1.0 per cent by weight of the butene charged. Catalyst attrition (mechanical) after 550 hours operation was also negligible.

Example 2

Using conditions similar to those described in Example 1 and using a catalyst in the form of 1/8 inch x 1/8 inch pellets prepared according to the procedure described in Preparation D hereinabove, the following results were obtained. The processing periods of 8 hours were followed by reactivation periods which in some cases were of only 5 to 6 hours duration. The following table lists average conversion and yield figures for several of the 8-hour process cycle periods.

| Cycle | 6 | 11 | 16 | 22 |
|---|---|---|---|---|
| Average Conversion per pass (Weight Per Cent Butene Charged) | 28.1 | 29.2 | 25.6 | 30.1 |
| Average Ultimate Butadiene Yield (Weight Per Cent Butene Charged) | 58 | 59 | 62 | 58 |

Virtually no isobutene was formed in these reactions. Carbon-deposition was reduced by the water gas reaction to 2.3 per cent by weight of the butene charged. Carbon-removal as carbon oxides in the product stream amounted to 0.7 to 1.0 per cent by weight of the butene charged.

Inasmuch as the foregoing description comprises preferred embodiments of our invention, it is to be understod that the invention is not limited thereto, and that modifications and variations may be made therein to adapt the invention to other uses without departing substantially therefrom. The invention is to be limited solely by the appended claims:

We claim:

1. In a process for the catalytic dehydrogenation of a dehydrogenatable hydrocarbon to a less saturated hydrocarbon the improvement whereby the yield of dehydrogenated hydrocarbon is increased, isomerization reactions are substantially repressed, the tendency to deposit carbon is decreased, the induction period of the catalyst is shortened and the water resistance of the catalyst is improved; which comprises contacting the hydrocarbon under dehydrogenation conditions with a multi-component catalyst composition consisting essentially of alumina formed by the dehydration of hydrated alumina, together with from approximately 2 to approximately 4 per cent by weight of magnesia, approximately 4 to approximately 6 per cent by weight of barium oxides calculated as barium hydroxide, and approximately 4 to 6 per cent by weight of potassium oxide calculated as potassium hydroxide.

2. A process according to claim 1 wherein butene is dehydrogenated to form butadiene.

3. A process according to claim 2 wherein a butene is dehydrogenated to produce butadiene at a temperature within the range of approximately 1100° to approximately 1300° F.

4. A process according to claim 1 wherein an alkylbenzene is dehydrogenated to form the corresponding alkenylbenzene.

5. A process according to claim 4 wherein ethylbenzene is dehydrogenated to form styrene.

6. A process for the dehydrogenation of dehydrogenatable hydrocarbons to form hydrocarbons having lower degrees of saturation which comprises contacting said hydrocarbons under dehydrogenation conditions with a catalyst consisting essentially of alumina formed by the dehydration of hydrated alumina together with from approximately 2 to approximately 4 per cent by weight of magnesia, approximately 4 to approximately 6 per cent by weight of barium oxides calculated as barium hydroxide and approximately 5 to approximately 6 per cent by weight of potassium oxide calculated as potassium hydroxide.

7. A process according to claim 6 wherein the catalyst consists essentially of alumina formed by the dehydration of hydrated alumina together with approximately 4 per cent magnesia, 5 per cent barium oxides calculated as barium hydroxides, and approximately 6 per cent by weight of potassium oxide calculated as potassium hydroxide.

8. A process according to claim 7 wherein butene is dehydrogenated to form butadiene.

WALTER A. SCHULZE.
JOHN C. HILLYER.

REFERENCES CITED

The following references are of record in the file of this patent:

UNITED STATES PATENTS

| Number | Name | Date |
|---|---|---|
| 2,391,646 | Schulze et al. | Dec. 25, 1945 |